3,398,016
COATING AND DRYING THERMALLY SENSITIVE THERMOPLASTIC FILM
Max Goldman, Tonawanda, and Miklos Wallenfels, Buffalo, N.Y., assignors to E. I. du Pont de Nemours and Company, Wilmington, Del., a corporation of Delaware
Filed July 10, 1964, Ser. No. 381,624
10 Claims. (Cl. 117—119.6)

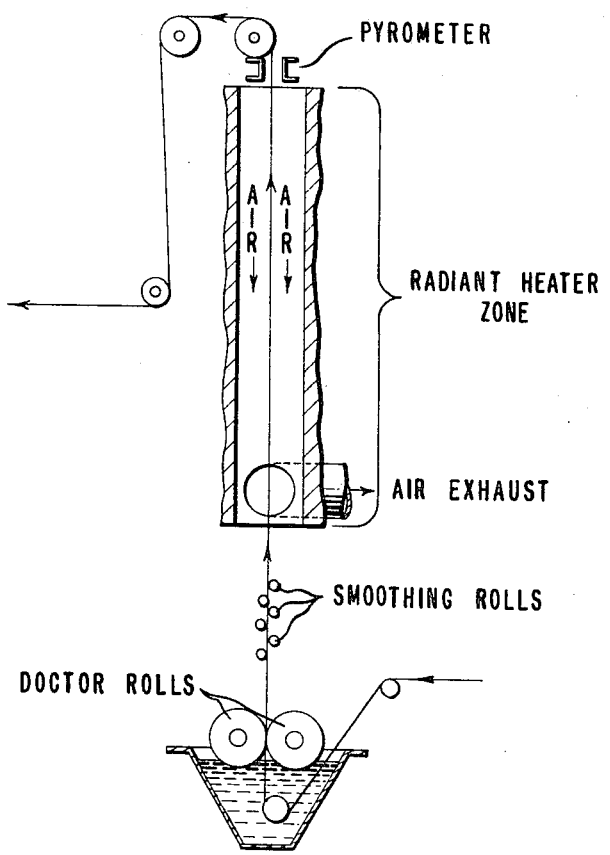

ABSTRACT OF THE DISCLOSURE

Coating and thereafter drying a thermally sensitive thermoplastic film utilizing radiant heat of specified intensity and countercurrent air flow at low temperature and high velocity.

---

This invention relates to the application of coatings on thermoplastic films and to the drying of such coatings. More particularly, this invention is directed to coating heat-sensitive thermoplastic films.

It is well known to apply coatings to various polymeric films to improve certain properties of the films, e.g., heat sealability, impermeability to water vapor, oxygen or carbon dioxide, grease resistance, and the like.

Because the application of a coating to the base film involves an additional processing step which adds to the cost of the final product, much work has been done to develop highly efficient coating processes. In coating operations where the coating ingredients are dissolved or dispersed in a suitable solvent or liquid carrier medium, the base film bearing the coating material is subjected to an elevated temperature and flow of air over the coated film to remove the solvent or liquid carrier medium as the coated film is moved through a drying zone. Such systems permit the application of coatings at high speeds.

However, a special problem is presented when the base film which is being coated is a thermally sensitive thermoplastic film, that is, a film whose properties or dimensions change when a certain elevated temperature is reached. In attempting to dry the coating, the temperature of the base film often exceeds the deformation temperature or temperature at which such changes occur in the thermoplastic film, either during removal of the solvent or liquid carrier medium from the coating or immediately thereafter when evaporation of the solvent or liquid carrier medium can no longer prevent temperature rise in the thermoplastic film.

As the coated film moves through the drying zone, even under relatively low tension, the film tends to shrink in the non-restrained transverse direction. In the coating of so-called heat shrinkable films this problem is especially acute. When high speed coating and drying operations involving heat shrinkable films are attempted under presently recognized technology, excessive transverse direction shrinkage is often experienced and the films obtained are frequently highly wrinkled, distorted and unsuitable for commercial use.

According to the present invention, an economical and efficient coating and drying process has been discovered which comprises applying an aqueous dispersion coating onto at least one surface of a thermally sensitive thermoplastic film, moving the freshly coated film through a drying zone such as a coating tower wherein the coated surface is subjected to radiant heat of intensity between 0.5 and 20 watts per square inch of exposed surface measured at the center line of the film and to countercurrent flow of air introduced into the drying zone at a temperature below about 30° C. below the deformation temperature of the film and moving at a velocity of between about 300 and 1500 feet per minute for a dwell time in the drying zone between about 1 and 20 seconds whereby the coating is dried while maintaining the thermally sensitive thermoplastic film below its deformation temperature. The incoming air temperature can for many films advantageously be at room temperature.

The term "deformation temperature" as used herein is defined as that temperature at which the film without restraint undergoes a change in dimension of at least 0.5%.

Suitable apparatus for practice of the present invention is shown in the attached schematic drawing wherein the various component are labaled and self-explanatory.

The process of this invention can be used for coating a variety of films including those normally considered as being dimensionally stable or heat set but which are thermally sensitive to a degree as well as the so called heat shrinkable films, i.e., films which will shrink at least 10% upon immersion in boiling water. Representative thermoplastic films usefully coated according to this invention include those of polyolefins such as polyethylene and polypropylene, polyvinyl chloride, polyvinyl fluoride, polyethylene terephthalate, polystyrene, copolymer films, polyamides, cellulose derivative films, and the like.

The aqueous coating materials are those known in the art and include, for example, vinylidene chloride copolymers, vinylidene chloride/methyl acrylate/itaconic acid terpolymer, other copolymers of vinylidene chloride with acrylic and methacrylic acid esters, with acrylonitrile, methacrylonitrile, terpolymers of such copolymers with acrylic and methacrylic acids, and the like. Ordinarily, aqueous dispersions of about 15% to 65% solids content will be used but no limitation on the present invention is intended in this regard.

The radiant heating may be from any convenient source such as infrared heaters including Calrod heating units and the like. The number and positioning of the heating units will be so adjusted to provide uniform heating effects across the width of the film. Preferred intensity of heat is between 2 and 17 watts per square inch of each exposed film surface. The combined effect of the radiant heat and the counter-current flow of air is the maintenance of the film surface from which the water is being removed ordinarily at a temperature between about 50° and 80° C.

Operation of the process of this invention permits efficient coating and drying at high speeds. For attainment of high speeds it is essential that the countercurrent air flow be at a velocity between about 300 and 1500 feet per minute and preferably between 600 and 1000 feet per minute. Higher air velocities cause the film to flutter badly in the drying zone whereas too low an air velocity may allow the film to reach too high a temperature and exceed the deformation temperature.

The lower air velocity limit may differ somewhat for different films depending on such factors as the dimensional stability characteristics of the particular film, the absorptivity of the film and the temperature of the air being supplied to the coating tower. The important consideration is that the counter-current flow of air must be supplied at such a rate that the deformation temperature of the film is not reached or exceeded.

This invention will be more clearly understood by reference to the following examples. These examples illustrate specific embodiments of the present invention and should not be construed to limit the invention in any way.

EXAMPLE 1

A biaxially oriented heat shrinkable polyethylene film made from a blend of 75% by weight of "Alathon" 1413 low density (0.915) resin and 25% "Alathon" 7020 high density (0.958) polyethylene resin as described in example of U.S. application Ser. No. 119,309 filed June 26, 1961, now abandoned by R. C. Golike and given a flame treatment as described in Example 1 of U.S. application Ser.

No. 231,219 filed Oct. 17, 1962, now Patent No. 3,255,034, by E. R. Covington and R. N. Moyer was drawn through the dip tank of apparatus of the type illustrated in the attached drawing. The dip tank contained a 41.6% solids aqueous dispersion of a vinylidene chloride copolymer containing 90.5 parts by weight of vinylidene chloride, 9.5 parts by weight of methyl acrylate and 2 parts by weight of acrylic acid. The film bearing the aqueous dispersion was drawn between doctor rolls which metered off excess coating dispersion leaving an amount on the film to yield a coating of 8 grams per square meter. The heaters were adjusted to provide a radiant intensity of 7 watts per square inch on each exposed film surface. Dwell time of the film in the heating zone was 2.9 seconds. Velocity of the air in the heating zone was 750 feet per minute and the temperature of the incoming air was 30° C. Maximum surface temperature of the film during drying was 55° C. The coated film showed no change in either the transverse or longitudinal dimensions and was entirely free of wrinkling.

By comparison, in a second experiment wherein the velocity of the air was reduced to 350 feet per minute the maximum surface temperature reached 85° C. and the film produced was very badly wrinkled.

EXAMPLE 2

Following the general procedure of Example 1, a biaxially oriented heat shrinkable film of polyethylene terephthalate such as described in Grabenstein U.S. Patent No. 2,784,456 issued Mar. 2, 1957, was coated with a vinylidene chloride copolymer dispersion of the type described in Example 1. The doctor rolls were adjusted so that a final coating weight of 4 grams per square meter was obtained on the base film. Radiation intensity was 6 watts per square inch on each exposed surface. Dwell time in the heating zone was 1.9 seconds. Air velocity was 650 feet per minute. Entering air temperature was 30° C. Maximum film surface temperature was 65° C. The coated film showed no dimensional change and no wrinkling.

By comparison, in a similar experiment at the same coating speed wherein the air velocity was reduced to 400 feet per minute, the coated film reached a temperature of 87° C. and the film so produced showed an intolerable shrinkage of 7%, thus demonstrating the criticality of air velocity according to the present invention.

EXAMPLE 3

Following the general procedure outlined in Example 1, a biaxially oriented, heat set polypropylene film was flame treated and then coated and dried. Final coating weight was 8 grams per square meter. Radiation intensity was 2.77 watts per square inch on each exposed surface. Dwell time in the heating zone was 6.3 seconds. Air velocity was 790 feet per minute. Entering air temperature was 30° C. Maximum film surface temperature was 62° C. The coated film showed no dimensional change and no wrinkling.

By comparison in a parallel experiment, the air velocity was reduced to 475 feet per minute. The surface temperature of the film reached 95° C. and the film produced was badly wrinkled. A shrinkage of 3% in the transverse direction was observed.

The foregoing examples can be repeated as will be readily understood by persons skilled in this art, by substituting other materials such as those listed above for those of the specific exemplifications.

It is to be understood that the foregoing detailed description is given merely by way of illustration and that many variations may be made therein without departing from the spirit or scope of this invention.

The invention claimed is:

1. The process comprising applying an aqueous dispersion coating onto the surface of a thermally sensitive thermoplastic film, moving the freshly coated film through a drying zone, subjecting said coated film in said zone to radiant heat of intensity between 0.5–20 watts per square inch of exposed surface and to counter-current flow of air introduced into said zone at a temperature below at least 30° C. below the deformation temperature of the film and moving at a velocity between about 300 and 1500 feet per minute, whereby the coating is dried while maintaining the thermally sensitive film below its deformation temperature.

2. The process as set forth in claim 1 wherein said radiant heat intensity is between 2–17 watts per square inch of exposed surface.

3. The process as set forth in claim 1 wherein said velocity is 600–1000 feet per minute.

4. The process as set forth in claim 1 wherein the film surface in said drying zone is at a temperature between about 50° and 80° C.

5. The process as set forth in claim 1 wherein said air introduced into said zone is at about room temperature.

6. The process as set forth in claim 1 wherein said thermoplastic film is heat-shrinkable polyethylene.

7. The process as set forth in claim 1 wherein said film is heat-shrinkable polypropylene.

8. The process as set forth in claim 1 wherein said film is heat-shrinkable polyethylene terephthalate.

9. The process as set forth in claim 1 wherein said film is heat set polypropylene.

10. The process as set forth in claim 1 wherein said film is heat set polyethylene terephthalate.

References Cited

UNITED STATES PATENTS

| | | | |
|---|---|---|---|
| 2,824,025 | 2/1958 | McIntyre. | |
| 2,861,354 | 11/1958 | Hultgreen. | |
| 2,933,417 | 4/1960 | McIntyre. | |
| 2,939,222 | 6/1960 | Svavar et al. | |
| 2,968,576 | 1/1961 | Keller et al. | |
| 2,971,267 | 2/1961 | Berlyn. | |
| 3,041,208 | 6/1962 | Hay et al. | |
| 2,405,813 | 8/1946 | Blanchard | 117—119.6 |
| 2,542,064 | 2/1951 | Tilden | 118—643 |
| 3,123,700 | 3/1964 | Snyder et al. | 219—388 |
| 3,166,435 | 1/1965 | Meier | 117—119.6 |
| 3,175,300 | 3/1965 | Nitchie | 34—41 |

ALFRED L. LEAVITT, *Primary Examiner.*

A. H. ROSENSTEIN, *Assistant Examiner.*